P. H. Kells,
Horse Power.
N° 15,296. Patented July 8, 1856.
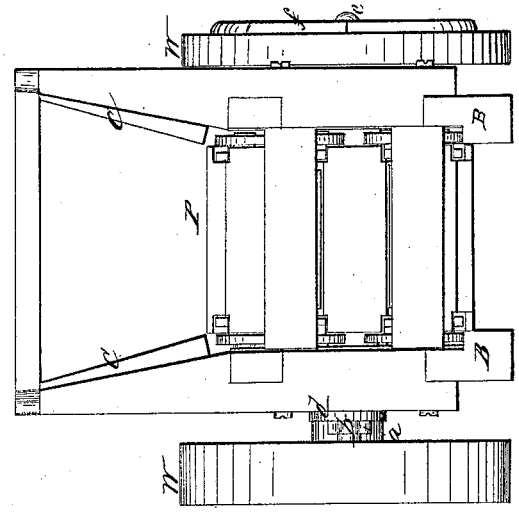
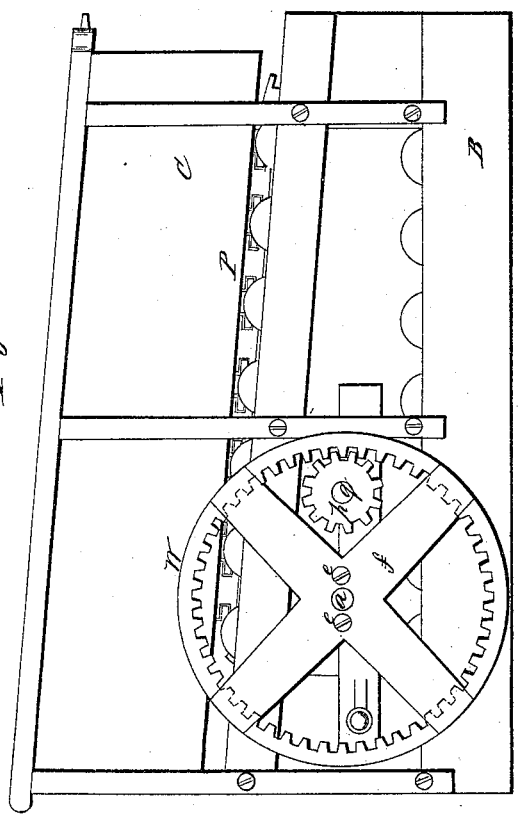
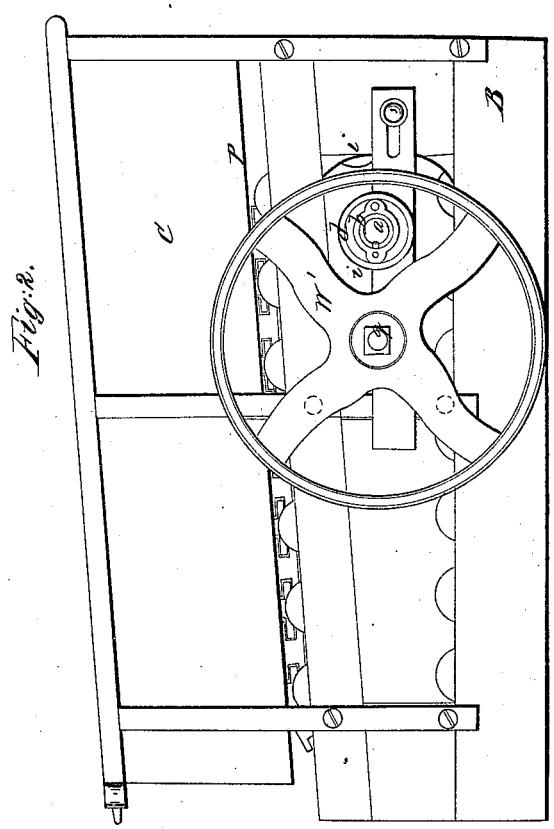

UNITED STATES PATENT OFFICE.

PHILIP H. KELLS, OF HUDSON, NEW YORK.

REVERSIBLE HORSE-POWER.

Specification forming part of Letters Patent No. 15,296, dated July 8, 1856; Reissued October 28, 1856, No. 406.

*To all whom it may concern:*

Be it known that I, PHILIP H. KELLS, of Hudson, in the county of Columbia and State of New York, have invented a new and useful Improvement in Horse-Powers; and I do hereby declare that the following is a full, clear, and exact description of the construction and operation of the same, reference being had to the annexed drawing, forming part of this specification, in which—

Figure 1 is a side elevation showing gearing. Fig. 2 is a side elevation showing band wheel. Fig. 3 is elevation of head.

Similar letters of reference in the several figures refer to the same part of the machine.

The object of my invention is the construction of endless chain horse powers in which motion is communicated to the belt pulley by what is termed converge gear, so that they may be converted at will into either right or left hand machines, without the introduction of any new parts either of shafting, belt or gear wheels.

The nature of the invention consists in constructing the machine so that the shaft of the overreaching belt pulley may be reversed in position, when the gear wheel shall be shifted to the opposite end of its shaft, and secured thereto; and that in every such position of the pulley shaft, the end of the gear shaft, and the fastenings on the same, shall preserve the same position relative to the overreaching belt pulley; by being within the plane of the inner side of the arms, spokes, or face of the said pulley: the gear wheel fastenings being the same on both ends of the shaft, and so related to the pulley shaft, that the converge gear shall duly mesh with the pinion of the pulley shaft, at each change of position of these several parts. The details of construction and operation will readily be understood from the following description and reference to the drawing.

The general features of the machine on which I have made the improvement which forms the subject of this specification, being well known to those conversant with mechanism of this character need not be more minutely set forth than is shown in the drawing, my invention being altogether independent of any of the well known constructions for rotating the gear shaft from the movement of the platform. These several parts will therefore be simply referred to by letter, and only described in their connection with my invention.

P, represents the platform; B, the base sills, and C the sides of the horse power.

The gear shaft $a$, projects on each side of the machine as is shown on the left in Fig. 3. On each end of this shaft is the coupling $b$ by which the shaft is connected with the gear wheel; the inner face of the junction of the arms $f$ of the gear wheel W having a socket for the reception of this coupling $b$; the shaft $a$ passing through the wheel, and the inner face of the wheel resting upon the shoulder $d$; screws $e$ passing through the wheel into the openings $i$ of the coupling. My improvement is not dependent on this mode of attaching the gear, as others may be employed which will serve the same purpose equally as well.

The converge gear wheel W meshes with the pinion $p$ upon shaft $q$, on the other end of which is the belt wheel W′ fastened by any of the well known modes. This belt wheel overreaches the end of the shaft $a$, opposite to that on which the gear wheel W is secured; and is so situated with respect to the end of the gear wheel shaft, that the plane of inner face of the arms, or spokes, of said belt wheel passes without said projecting end of gear shaft.

By this construction the removal of the belt and gear wheels is at once effected; and then by removing the caps which hold the belt shaft in position, this shaft is readily reversed in position; so as to bring the pinion upon the opposite side of the machine. The gear wheel W is at once secured to the opposite end of its shaft $a$, and owing to the relative positions of the several parts of the two shafts, the converge gear at once engages the pinion. The belt pulley W′ is then secured upon its shaft, and owing to its relation to the projecting ends of shaft $a$, its inner face passes clear of said shaft in the overreaching of the pulley. These adjustments being completed the machine is ready for operation.

The simplicity of this mode of converting the power from a right to a left hand machine, is of great importance to all employing such machinery.

Having described my improvement and the operation thereof, I claim as new and of my own invention and desire to secure by Letters Patent—

Constructing the machine so that the shaft of the overreaching belt pulley may be reversible, when the gear wheel shall be shifted to, and secured upon, the opposite end of its shaft; and that in every such position of the pulley shaft, the end of the gear shaft and the fastenings thereon shall be within the plane of the inner side of the arms, spokes or face of said pulley: the gear wheel fastenings being the same on both ends of its shaft, and so related to the pulley shaft, that the converge gear shall duly mesh with the pinion of said shaft, at each change of position of these several parts, substantially as herein before set forth, for the purpose of changing from a right to a left hand machine, or the reverse.

In testimony whereof, I have hereunto signed my name before two subscribing witnesses.

PHILIP H. KELLS.

Witnesses:
    GEO. PATTEN,
    R. H. PATTEN.

[FIRST PRINTED 1912.]